(12) United States Patent
Manson

(10) Patent No.: US 8,408,820 B2
(45) Date of Patent: Apr. 2, 2013

(54) LEVELLING APPARATUS

(75) Inventor: Graham Manson, Nelson (NZ)

(73) Assignee: EI-Electronic Ideas Limited, Glasgow, Strathclyde (GB)

( * ) Notice: Subject to any disclaimer, the term of this patent is extended or adjusted under 35 U.S.C. 154(b) by 0 days.

(21) Appl. No.: 12/996,569

(22) PCT Filed: Jun. 5, 2009

(86) PCT No.: PCT/GB2009/050630
§ 371 (c)(1),
(2), (4) Date: Mar. 7, 2011

(87) PCT Pub. No.: WO2009/147447
PCT Pub. Date: Dec. 10, 2009

(65) Prior Publication Data
US 2011/0164870 A1    Jul. 7, 2011

(30) Foreign Application Priority Data

Jun. 7, 2008 (GB) .................................. 0810427.5

(51) Int. Cl.
G03B 17/00 (2006.01)
(52) U.S. Cl. ......... 396/428; 396/419; 396/421; 396/425
(58) Field of Classification Search ................ 396/419, 396/421, 428, 425
See application file for complete search history.

(56) References Cited

U.S. PATENT DOCUMENTS

| 1,634,950 A * | 7/1927 | Lucian ........................... 114/191 |
| 2,296,674 A * | 9/1942 | Ingels ......................... 248/180.1 |
| 3,742,770 A * | 7/1973 | Flannelly ....................... 74/5.34 |
| 4,838,117 A | 6/1989 | Bittner |
| 4,886,230 A | 12/1989 | Jones |
| 5,042,763 A * | 8/1991 | Wong .......................... 248/178.1 |
| 5,463,432 A * | 10/1995 | Kahn ............................. 352/243 |
| 5,875,685 A * | 3/1999 | Storaasli ...................... 74/490.1 |
| 5,897,223 A * | 4/1999 | Tritchew et al. ................ 396/13 |
| 6,263,160 B1 * | 7/2001 | Lewis ............................. 396/13 |
| 6,421,622 B1 * | 7/2002 | Horton et al. ................... 702/95 |
| 6,611,662 B1 * | 8/2003 | Grober ............................. 396/55 |
| 6,820,980 B1 | 11/2004 | Romanoff |
| 7,311,452 B2 * | 12/2007 | Chapman ...................... 396/428 |
| 7,642,741 B2 * | 1/2010 | Sidman ......................... 318/649 |
| 2004/0208499 A1 * | 10/2004 | Grober ......................... 396/428 |
| 2010/0310249 A1 * | 12/2010 | Tanaka ......................... 396/428 |

FOREIGN PATENT DOCUMENTS

| CN | 101021673 A | 8/2007 |
| EP | 0257988 A | 3/1988 |

OTHER PUBLICATIONS

International Search Report from International Application Publication WO2009/147447, dated Oct. 8, 2009.

* cited by examiner

*Primary Examiner* — Clayton E Laballe
*Assistant Examiner* — Warren Fenwick
(74) *Attorney, Agent, or Firm* — Michael Best & Friedrich LLP

(57) ABSTRACT

A levelling apparatus, and in one embodiment a portable levelling camera mount (10) having a platform (14) for mounting a camera, a sensor (16) for detecting an orientation of the platform; and an actuator (12) coupled to the platform, which moves the platform in response to the orientation detected via the sensor. Typically, the mount may have a selector to operate the mount to level solely a first axis of the platform to a reference plane while the second axis of the platform is tilted with respect to the reference plane, or to operate the mount to level the platform such that both the first and the second axes of the platform are leveled to the reference plane.

14 Claims, 4 Drawing Sheets

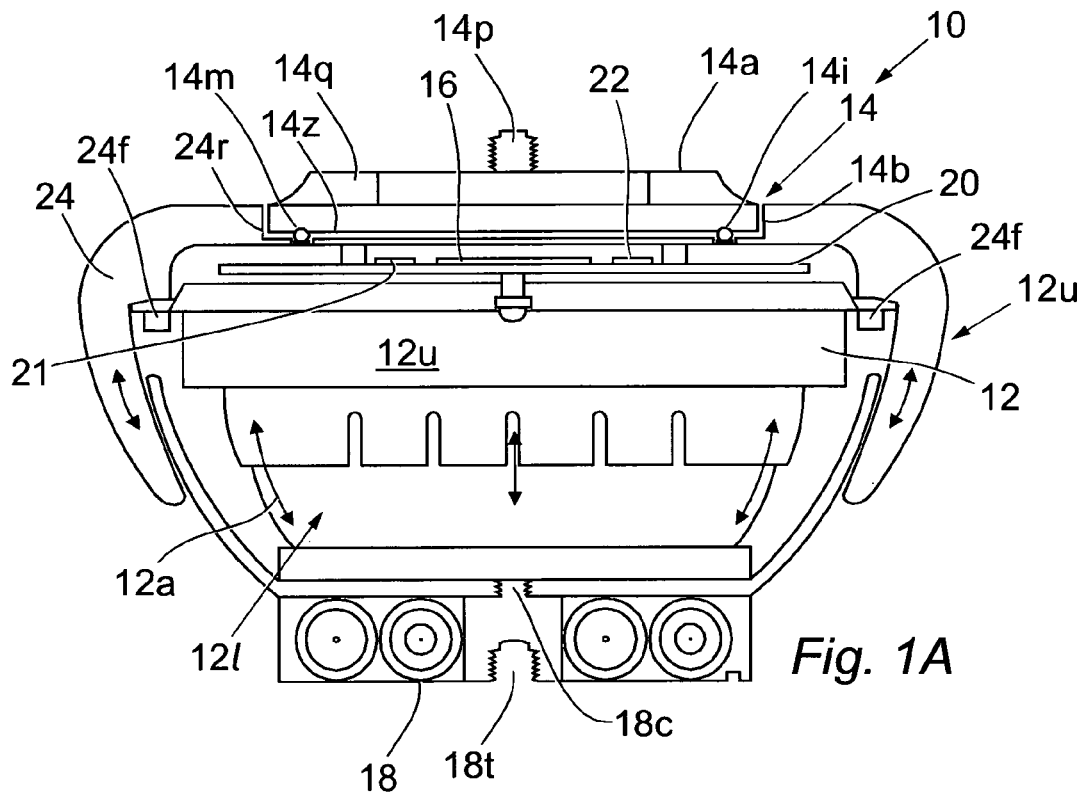
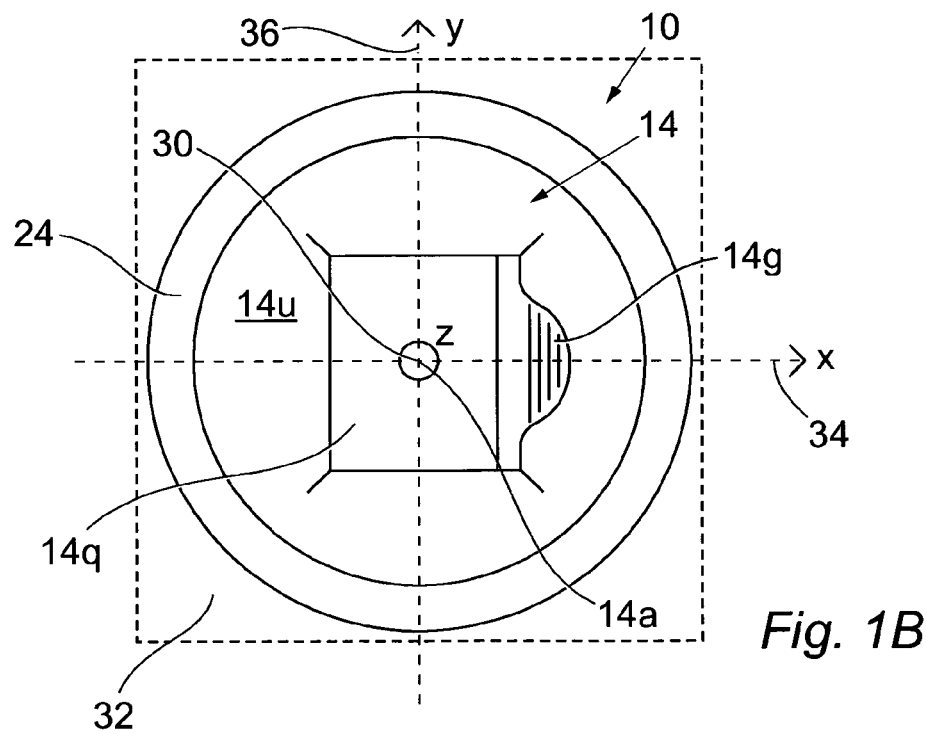

LEVELLING APPARATUS

The present invention relates to a levelling apparatus, and in particular, but not exclusively to a mount and kit for levelling a camera to align with a particular reference frame. In particular embodiments, it relates to a portable levelling camera mount.

In the field of optical instruments, it is useful for many purposes to mechanically align such instruments in a particular direction or orientation where accurate alignment without mechanical aids is unreliable or difficult. Such optical instruments may include telescopes, binoculars, video cameras, and still photographic cameras. In still photography applications, it is an advantage to accurately level a camera so that it is aligned with the horizon for taking landscape or panoramic pictures.

At present, cameras are typically leveled by use of visual spirit level indicators attached to manually adjustable support for the camera, for example, a tripod or specific levelling heads. Such visual determination and manual adjustment to level the camera is inaccurate and time consuming being reliant on users' line of sight and steadiness of hand.

According to a first aspect of the invention, there is provided a portable levelling camera mount comprising:

a platform for mounting a camera, the platform defining at least one axis for alignment of the camera thereto;

a sensor for detecting an orientation of the platform; and an actuator coupled to the platform, wherein said actuator moves the platform in response to the orientation detected via the sensor for levelling the at least one axis to a reference plane.

Typically, the platform has a surface defining a first axis and a second axis, and the mount is operable in a first levelling mode, in which said actuator moves the platform such that solely the first axis of the platform is leveled to the reference plane and the second axis of the platform is tilted with respect to said reference plane. This is advantageous where it is desirable to tilt a camera about one axis, but keep that axis (about which the camera is tilted) leveled with respect to the reference plane.

Typically also, the mount has a second levelling mode in which said actuator moves the platform such that both the first and the second axes of the platform are leveled to the reference plane. The mount may be selectively operable in the first and/or second levelling modes.

The mount may have a selector for selectively operating the mount in the first and/or second levelling modes. The selector may be for example a user-operable button, toggle or other switch, for selecting the levelling mode. More specifically, the selector may include a touch-operable button for one-touch operation of the mount in a levelling mode.

Alternatively, the mount may be programmed, e.g. via a programmable micro-controller, to determine and/or select the levelling mode according to an orientation detected by the sensor, for example, in response to a detection signal. Thus, the reference plane may be automatically determined without separate manual user input.

Typically, the reference plane is selectable from at least one of the group consisting of:
 a. a true horizontal plane;
 b. a plane inclined by an angle of about 45° to horizontal; and
 c. a true vertical plane.

The reference plane may be user-specified, for example, the mount may include a reference plane selector button, for example a user-operable button, toggle or other switch, for a user to select and/or input the levelling datum and/or reference plane information. The mount may be programmed to select the reference plane according to an orientation detected by the sensor.

In use, the mount generally is typically positioned in one of the orientations selected from the group consisting of:
 a) horizontal;
 b) vertical; and
 c) inverted horizontal.

Thus in configuration c), the mount may be mounted upside down, in an opposite orientation to its configuration in a).

The platform in the first levelling mode may be tilted about the leveled axis by a user-specified tilt angle. The reference plane and/or the tilt angle may be user-specified and may be adjusted by a user-operated button or keys, for example arrow keys which identify the sense of motion caused by the adjustment. The mount may provide for a user to input a custom horizontal strike angle and a tilt angle characterising the reference plane. This may be advantageous for taking creative/themed photos with the camera.

Typically, the platform is lockable in position after the first and/or second axes of the platform have been leveled to the reference plane.

The selector may include an infra-red (IR) communication device for remote control of the mount.

Preferably, the sensor is a solid state electronic sensor. More specifically, the sensor may have a micro electro-mechanical system (MEMS) accelerometer for determining inclination of the sensor and/or the platform. The accelerometer may be a 3-axis accelerometer for true or absolute orientation of the platform in space. Thus, the sensor may be adapted to detect the absolute orientation of the platform in space. This provides improvements in portability, accuracy and cost.

Preferably, the mount includes a controller, e.g., a microcontroller, programmed to control movement of the platform. The controller may be adapted to receive a detection signal from the sensor and produce an actuation signal for controlling the actuator. In addition, the controller may be programmed to determine the movement required, for example the amount of movement of the actuator and/or platform, to level the platform axes to a particular levelling datum or reference plane. The controller may therefore further be configured to store levelling datum or reference frame information, such as the required reference frame to which the platform is to be leveled. The controller may be programmed to store user-input data, for example, a custom tilt angle. Thus, a user may recall the custom tilt angle or other data from memory when required.

The actuator may include a drive mechanism. The drive mechanism may be operable to move the platform in six degrees of freedom. Thus, in embodiments of the invention, the platform can be moved about and in the direction of three orthogonal axes to take up any orientation in space.

Preferably, the platform has a planar support surface for the camera. The planar support surface typically defines the first and second axes. The first and second axes are typically orthogonal axes that intersect each other. The actuator may be operable to move, untilt and/or level the platform in the direction defined by the first axis. In addition, or alternatively, the actuator may be operable to move, untilt and/or level the platform on the second orthogonal axis. Thus, the actuator may be adapted to independently level on orthogonal axes. This may facilitate operation of the mount, particularly, in said first mode of operation.

The planar support surface defining the first and second orthogonal levelling axes may be in the form of an outer surface of the platform for supporting, abutting, locating against and/or contacting a base or other surface of a camera. Where the reference plane is a horizontal plane, levelling of both axes in the second levelling mode to thereby align the axes and the surface of the platform with the horizontal plane is advantageous for taking panoramic photos.

In an embodiment, the outer surface may face upwards and be oriented substantially horizontally, in use. Alternatively, the outer surface may be oriented substantially vertically in use.

The mount may have a pivot for allowing the platform with the camera attached thereto, to be rotated, for example to achieve a horizontal pan in the second levelling mode. In this way, the platform/camera may be rotated independently of a base portion of the actuator and/or the mount.

Further, the mount may have a connector or other attachment means for attaching and/or securing the camera to the platform. The attachment means may be provided with a pivot for allowing the platform with the camera attached thereto. In certain embodiments, the platform may be rotated with respect to and independently of the upper and/or lower portions of the actuator. The attachment means may include a quick-release mechanism, e.g. a quick-release plate, so that the platform with the camera secured thereto, can be readily detached and re-attached to the mount as required.

The mount may include a locking mechanism to lock the platform in its leveled position, e.g. after operation of the mount in first and/or second modes, to ensure no movement with respect to other components of the mount. More specifically, the mount may have an upper member including the platform and a base member for locating on a supporting surface, wherein the upper member may be moveable with respect to the lower member to level axes of the platform, and the mount may be further operable to lock the platform in position with respect to lower member when axes of the platform are leveled to the reference plane. This facilitates supporting larger optical apparatus including, for example, larger cameras and lenses.

The mount may have an indicator for indicating the degree of alignment with the reference plane. The mount may have an indicator for indicating the orientation of the platform. The indicator may be a visual or audio indicator. The visual indicator may be an LED lamp or LCD display.

The platform may also be provided with alignment means, for example an alignment notch, to align an optical axis of the camera with respect to the platform axes and/or the actuator Preferably, the mount takes the form of an independently operable electronic mount containing its own power supply. Thus, it is a self-contained electronic device, and does not rely on attachment to separate equipment to operate. The mount may have the form of a photographic accessory. Typically, the mount is provided with a compact casing for housing components selected from the group consisting of: the actuator, the platform, the sensor, a selector, a power supply, and a controller. In addition, the mount is preferably a light-weight and compact device having an overall height of between 5 and 15 cm, and a maximum width of between 5 and 15 cm. The mount is typically configured to be located for use on a stable, non-level surface.

The power supply may provide power for the actuator and electronics, and may be a battery supply, thereby facilitating portability of the mount.

The mount may comprise mini-support legs for standing the mount on a surface, for example a table. Alternatively or in addition, the mount may be provided with a connector for attaching the mount to a stand or auxiliary support frame, such as a tripod.

In a second aspect of the invention, there is provided a camera levelling kit, comprising a portable levelling mount according to the first aspect of the invention and a further kit part selected from the group consisting of: a remote control; a battery pack; a battery charger; and an adapter for a battery to be charged from a vehicle.

The remote control may include an optical transmitter, for transmitting an Infra Red (IR) or other signal. The levelling mount may include a receiver for receiving a signal from the remote control for communication therebetween.

The remote control may be operable to initiate operation of the mount in the first or second modes.

According to a third aspect of the invention, there is provided a levelling apparatus for optical apparatus, the levelling apparatus comprising:

a platform for mounting optical apparatus, the platform defining at least one axis for alignment of the optical apparatus thereto;

a sensor for detecting an orientation of the platform; and an actuator configured to move the platform in response to the orientation detected via the sensor from a first, non-leveled configuration to a second, leveled configuration in which the at least one axis of the platform is leveled to a reference plane, and a locking mechanism whereby the platform is locked in position when the leveled configuration is reached.

Additional features of the third aspect of the invention may include one or more of the features referred to in the first and second aspects of the invention as appropriate.

According to a fourth aspect of the invention, there is provided levelling apparatus for optical apparatus, the levelling apparatus comprising:

a platform for mounting optical apparatus, the platform defining first and second axes;

a sensor for detecting an orientation of the platform; and an actuator configured to move the platform in response to the orientation detected via the sensor from a first, non-leveled configuration to a second, leveled configuration in which at least one axis of the platform is leveled to the reference plane; and a selector for selecting the reference plane to which the axis is leveled.

The levelling apparatus may take the form of a portable levelling camera mount. The optical apparatus may be a camera or the like.

Additional features of the fourth aspect of the invention may include one or more of the features referred to in the first and second aspects of the invention as appropriate.

According to a fifth aspect of the invention, there is provided a levelling apparatus for optical apparatus, the levelling apparatus comprising:

a platform for mounting optical apparatus, the platform defining first and second axes for alignment of the optical apparatus with at least one of said axes;

a sensor for detecting an orientation of the platform; and an actuator coupled to the platform, wherein said actuator moves the platform in response to the orientation detected via the sensor, and in a first levelling mode, moves the platform such that solely the first axis of the platform is leveled to a reference plane and the second axis of the platform is tilted with respect to said reference plane.

Additional features of the fifth aspect of the invention may include one or more of the features referred to in the first and second aspects of the invention as appropriate.

According to a further aspect of the invention, there is provided a levelling apparatus for optical apparatus, the apparatus comprising:

a platform for mounting optical apparatus;

a sensor for detecting an orientation of the platform; and an actuator configured to move the platform in response to the orientation detected via the sensor for levelling the platform to a reference plane.

This aspect of the invention may include one or more of the features referred to in the first and second aspects of the invention as appropriate.

There will now be described by way of example only, embodiments of the invention, with reference to the accompanying drawings, in which:

FIG. 1A is a cross-sectional representation of a levelling camera mount, in accordance with an embodiment of the invention;

FIG. 1B is an overhead representation of the camera mount of FIG. 1A;

Figure 1C:
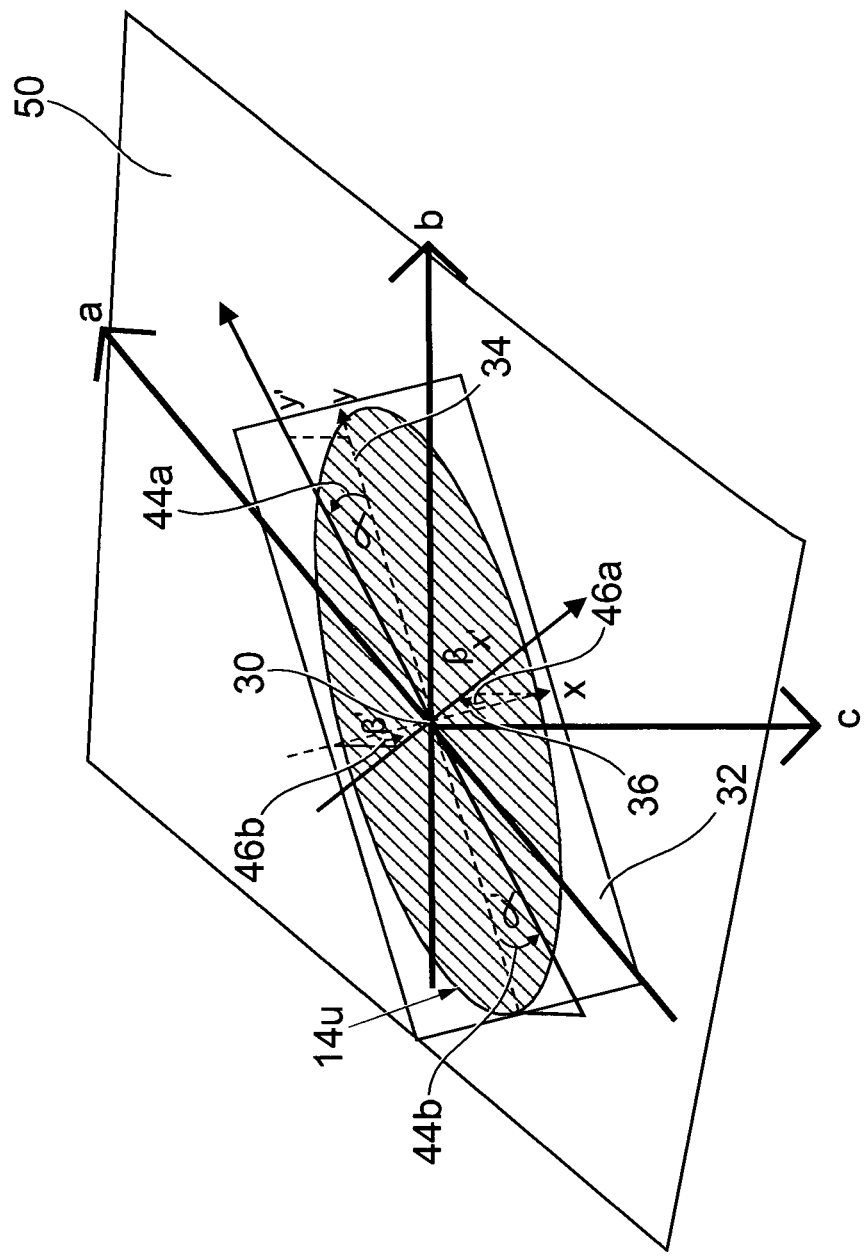
FIG. 1C is a representation of levelling corrections carried out by the mount of FIGS. 1A and 1B in dual axis mode, according to an embodiment of the invention.

With reference firstly to FIGS. 1A and 1B, there is shown generally a portable levelling camera mount 10 (constituting "levelling apparatus") with an upper platform 14 to which a camera can be attached. The mount 10 includes an electrical actuator 12 provided with a lower assembly 12*l* and an upper assembly 12*u* that is movable with respect to the lower assembly 12*l* as indicated by arrows 12*a*. The platform 14 is attached to the upper assembly 12*u*. An internal drive mechanism (not shown) of the actuator is configured to drive movement of the upper assembly 12*u* so that the upper assembly 12*u* and platform 14 is tilted through a particular correction angle that compensates for camera misalignment.

The camera mount 10 has a 3-axis electronic sensor 16 which senses the orientation of the mount 10 in space, and from this the required correction angle, direction and amount of movement is determined and the platform is tilted accordingly.

The general operation of the mount 10 is described in further detail below. The mount 10 is a compact electronically operated device which is powered, in this example, by a battery pack 18 attached to the bottom of the actuator 12, typically via an actuator drive circuit (not shown) adapted for the actuator used. The battery pack provides power to drive the actuator 12, along with the sensor 16 and a micro controller 22 via a power control board (PCB) 20.

When the mount has its power switched on, the sensor 16 detects the initial orientation of the actuator 12 and platform 14, and sends a corresponding detection signal to the micro controller 22 containing the orientation information. The micro controller 22 is programmed to compare the orientation information with a geographic reference frame, and determine the correction angle and the movement required to level a predetermined axis defined by the platform to a reference plane. To assist with this, required information is stored on an EEPROM memory module 21 connected to the PCB 20. A correction signal is then sent from the micro controller 22 to the actuator 12, which causes the upper assembly 12*u* to move a corresponding amount in response to the correction signal. This information may, in other examples, be stored on micro controllers coupled to the EEPROM memory module 21.

The sensor carries out a further measurement of orientation which is compared by the micro controller against the reference frame to check accuracy of the correction and alignment match with the reference frame. This process is repeated until an accuracy of match of within 0.1° is achieved. The platform is then locked and held in the corrected position when levelling following the process above is complete, and the power is then switched off. The switch off may be initiated by a user, or the mount may be programmed to switch off automatically after a set time period has elapsed after the platform has been leveled and locked, which may help to maximise battery life.

Typically, the micro controller 22 is programmed to control the speed of movement of the actuator 12 during the levelling process described above, such that for larger discrepancies or correction angles, coarser movements can be made which are performed at higher speeds to ensure rapid levelling and then when the platform is moved to close to level, for example within a few degrees of levelling to the reference plane, the speed is reduced to ensure accuracy.

In terms of structure, the PCB micro controller 22 and sensor 14 are held securely in place by a cover 24 to the upper assembly 12*u*. The cover forms a part of a protective casing for the mount 10; the extension of the lower assembly 12*l* of the actuator provides a further part of the casing. Fixing pins 24*f* are used to attach the cover 24 to the actuator, and these components are thereby fixed to and move along with the upper assembly 12*u* of the actuator 12.

The cover 24 is also provided with a recess 24*r* into which a base portion 14*b* of the platform 14 is received. The platform is securely mounted to the cover 24 so that it does not tilt with respect to the cover 24 or the upper assembly 12*u*. Thus, orientation of the sensor 14 is an accurate proxy for orientation of the platform 14. In this regard, it is important to ensure that orientation of an upper surface face 14*u* of the platform 14, against which a base of the camera (not shown) is intended to lie, is known.

The platform 14 is rotationally mounted in the recess 24*r* allowing the camera, when attached to the platform, to be "panned" around a central z-axis 14*a* of the platform. In this example, the platform can be rotated with respect to the cover 24 about the axis 14*a* to different positions set apart in this case by an angle of 22.5°. In each position, the platform 14 is held from rotation by spring biased engaging members 14*m* which upstand from the cover 24 and engage with corresponding indents 14*i* in a base surface 14*z*. When torque is applied to the platform 14, the engaging members 14 are forced against the spring by virtue of the indent/engaging member shape and geometry such that the members retract and the platform is allowed to rotate into the next position where the members 14*m* can again engage with the indents 14*i*. In an alternative example, the mount may be fitted with a motor which acts to rotate the platform stepwise to desired angular positions.

Further, the platform 14 has a central threaded connection pin 14*p* to attach with a corresponding threaded connector (not shown) in a camera base to secure the camera to a quick release plate 14*q*, which is in turn attached the platform. The quick release plate 14*q* can be detached from the platform by engaging quick release button 14*n*, as described in further detail below. In this example, the button is provided with a series of grooves 14*g* which are designed to cooperate with surfaces of a camera when correctly attached to allow a user to align the camera with respect to the platform. In another embodiment, the quick release plate 14*q* may have a locating pin to ensure the camera is correctly aligned with the quick release plate and the levelling mount as a whole.

In addition, the mount 10 has, in the base of the battery pack 18, a threaded connector 18*t* that can be used to screw the mount 10 to a support, for example, to a tripod (not shown). The threaded connector 18*t* typically includes a ⅜ inch recessed thread, and may be adapted to receive a thread reducer to provide a ¼ inch. In alternative embodiments, the mount can be placed with the base assembly and battery pack directly on a planar surface such as provided by a table top, car, post, rock or other convenient object.

It will be appreciated that the various components of the mount may be arranged differently for example to maximise compactness. In the embodiment described above, the PCB and actuator are encased, but in other examples, the battery pack will also be housed within the casing. The PCB 20 may be arranged against the base portion of the actuator lower assembly 12*l*, and generally adjacent the actuator. The battery pack 18 may be arranged either side of the actuator. An additional, separate base portion of the casing may be fitted and secured to the lower assembly of the actuator. Typically, the battery pack, PCB, and actuator are co-axially located or "stacked" above each other, with intermediate holding rings if required for example to co-locate or fix adjacent components with respect to one another. The actuator 12 may be inverted so that the wider "upper" assembly of the actuator of FIG. 1A faces downwards away from the platform, to provide additional stability. The components may be distributed within the casing to provide a wider base compared with the platform, for enhanced stability. The device has typically an overall height of no more than 15 cm and a maximum width of up to 15 cm. Generally, the casing will be dimensioned to fit snugly around and closely follow the contours of the different components, to minimise materials and reduce size.

The mount is configured so that the platform surface face 14*u* can be tilted into different orientations, about a central point 30 of the xy-plane 32 coincident with the surface face 14*u*. In order to move the surface into a desired orientation by the required correction angle, the mount 10 has two general modes of operation, explained now with further reference to FIGS. 1C and 1D.

In one levelling mode (constituting the "second levelling mode") shown schematically in FIG. 1C, the platform's upper surface 14*u* is "leveled" by untilting the platform 14 and upper assembly 12*u* of the actuator by a first angle 44*a,b* defined along a first axis 34 and by a second angle 46*a,b* defined along a second axis 36 perpendicular to the first axis intersecting each other at the centre point 30.

The required correction angle and tilt angle in each of these directions is determined by the microcontroller using information acquired by the sensor and is input in the form of an actuation signal to the actuator of the mount.

Untilting of the platform in this mode brings the x-axis 36 of surface 14*u* and the y-axis 34 of surface 14*u* into alignment, thereby levelling both the x and y-axes to the ab-plane 50 (constituting the "reference plane"). The abc-space, in this example, is a geographic reference frame, in which the ab-plane is horizontal, and the c-axis is vertical. Thus, when the mount operates in this mode, a camera attached to the platform 14 can be brought into alignment with the horizon. By virtue of the connection of the platform in the recess 24, the platform can be rotated about the axis 14*a* whilst remaining in that same plane for "panning" of the camera. This may assist particularly with landscape photography.

Figure 1D:
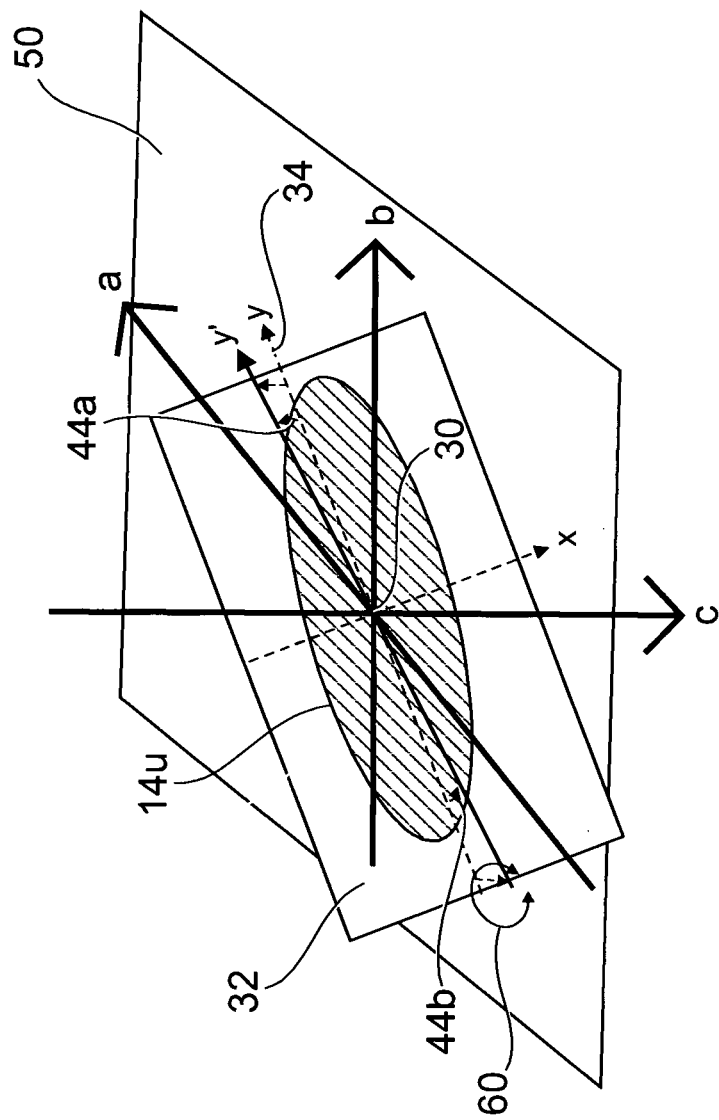
FIG. 1D is a representation of a levelling correction carried out by the mount of FIGS. 1A and 1B in single axis mode, according to an embodiment of the invention.

In another levelling mode (constituting the "first levelling mode") shown in FIG. 1D, the upper surface 14*u* of platform 14 is leveled by merely untilting the platform 14 by a correction angle 44*a,b* defined along the first axis 34. In this mode, only the y-axis of upper surface 14*u* is brought into alignment and coincidence with the horizontal and leveled to the ab-plane 50 by virtue of the correction tilt. The x-axis 36 is not brought into any such alignment. A camera attached to the platform 14 is therefore free to be tilted about the x-axis 36 as indicated by arrow 60, whilst the y-axis 34 remains accurately aligned and leveled to horizontal. The platform may be tilted by the actuator about the x-axis by a specified angle, which may be input by a user. This levelling mode is beneficial in many photographic shots where the horizon is not visible in the camera for example when taking close-up photos of the objects on the ground. To achieve this, the camera lens is aligned on the platform 14 to point along the non-leveled x-axis 36.

It will be appreciated that in other embodiments (not shown), the axes 34,36 can be untilted to be brought into alignment with/leveled to other selected non-horizontal reference planes, in particular, a single axis aligned with vertical planes for left or right handed portraits; or both axes of the surface 14*u* aligned and leveled to the inverted or "up-side-down" horizontal plane, such that the mount can be mounted in an inverted configuration (platform facing downwards in use) and operate in a similar manner to level the platform in the first or second levelling modes. In particular, the reference plane may be selected from a group of planes tilted at 0°, 45°, 90°, 135°, 180°, 225°, 270°, and 315° from horizontal. For example, the 180° plane may be selected when the mount is used in the inverted configuration.

In specific embodiments (not shown), the mount has an infra red detector to allow selection of the reference levelling plane by a remote control having an infrared transmitter. The remote control may be provided as part of a kit product along with the camera mount 10. It will be appreciated that other means of remote communication could be employed instead of an infrared detector/transmitter system, for example, using radio frequency (RF) or other signalling techniques such as Bluetooth™. In this way, a computer could be used to remotely connect to the mount and control operation of the mount and for example select levelling modes or make adjustments to tilt angles.

The presently described mount 10 can correct for errors or misalignments of the platform/camera of up to around 25° with respect to horizontal (or other reference plane) since the overall angular range of movement of the platform and upper actuator with respect to the base portion of the mount is 25°. However, this requires the actuator to be driven over the full range, and in general in order to level the camera successfully to a horizontal plane, the base of the mount needs to be initially located on a surface or connected to tripod such that it is within 12.5° of horizontal. Similarly, in embodiments where the camera is to be leveled to other reference planes the mount 10 in its neutral or untilted configuration (i.e., the platform is aligned and untilted with respect to the base) must be located with the platform face 14*u* having a maximum tilt angle within that 12.5° levelling limit. It will be appreciated however, that in other embodiments, the actuator may be configured differently to operate over a wider angular range, for example to correct for misalignments of up to around 45° or greater.

In certain embodiments, the mount is configured to determine the relative orientation of the upper assembly 12*u* with respect to the base of the mount. If the upper assembly is tilted with respect to the lower assembly 12*l*, a given angle of correction may not be attainable if the extent of movement is limited to a particular angular range, as in the above described example of FIGS. 1A to 1D. Thus, information about the orientation of the upper assembly with respect to the lower assembly may be used and processed by the micro controller 22 to determine whether a certain angle of correction is available, and whether, with the upper and lower assemblies tilted, the platform can be leveled to a particular reference frame.

This prevents the actuator from driving against stops at its extremes of movement which reduces wear on the drive mechanism.

In particular embodiments, the mount 10 has a locking mechanism which locks the upper assembly 12u with respect to the lower assembly 12l after the levelling process has taken place, thereby maintaining the platform 14 in the leveled orientation.

In particular embodiments, the sensor 16 and micro controller 22 is programmed to determine the initial orientation, and based on that orientation determine automatically which reference plane to use. For example, if in the initial orientation the mount (in its neutral configuration) is tilted by an angle of within 12.5° of vertical, the mount levels the platform 14 to that vertical plane.

In terms of levelling accuracy, the sensor 16 detects the orientation of the mount 10 to an accuracy of 0.1°. Similarly, the actuator drive mechanism is configured to move the upper assembly 12u so that the same 0.1° accuracy is achieved by the mount overall. In addition, the actuator drives the movement at a levelling rate of around 1-3° per second to achieve rapid settling times of less than around 6 seconds.

The camera mount 10 includes an LED lamp (not shown) which indicates whether the initial alignment of the mount is within the necessary levelling range. Such an indicator lamp may also be provided to indicate when the platform has been leveled to the selected plane. Other visual or audio indicators could be also used instead of the LED lamp, for example, an LCD display. The indicators may in embodiments also indicate the accuracy and/or degree of alignment with respect to the reference plane. In embodiments where the mount is accompanied with a remote control, information regarding alignment and accuracy may be displayed on the remote control, and the remote could also include fine adjustment and angle selection controls for selecting a particular plane to which the platform is to be leveled.

The camera mount 10 is provided with push buttons (not shown) for operating the mount. One such button is used to turn the power on for commencing levelling. A single button push therefore allows levelling to start, providing for ease of use. The buttons may also be pressed to select the different modes of operation. The micro controller 22 is programmed to receive signals from the buttons which are interpreted to control operate the mount 10 accordingly.

Further, the mount 10 could in other embodiments be configured to log and store operational errors in an error log in the memory module 21 so that problems can be diagnosed and repaired if necessary.

The mount may also be provided in a kit accompanied with battery charger, and/or an adapter for connecting to a power supply of a car, for example, via the cigarette lighter fitting, so that the battery can be readily charged when travelling.

Figure 2:
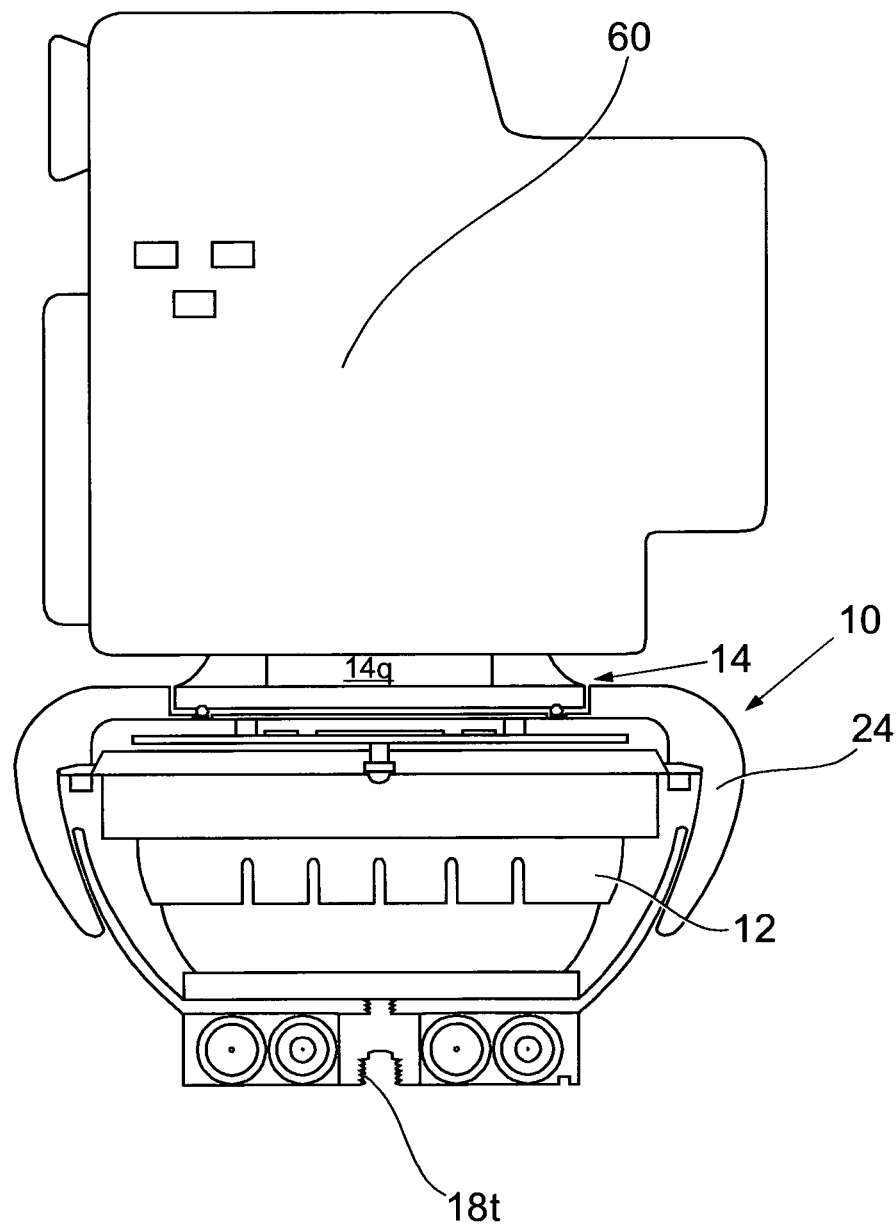
FIG. 2 shows a camera mount in use with a hand-held camera according to a further embodiment of the invention.

In FIG. 2, the mount 10 is shown connected to a camera 60. The base of the camera 60b is attached via the threaded pin 14p to the quick release plate 14q, removably detachable to the platform 14 by actuating the release button 14n. This allows the camera 60 with the quick release plate 14q attached to be readily removed or attached from the mount when required.

In other variants, the platform itself forms a quick release plate where the platform is detachably mounted and is released by a release button. The button may operate to undo a mechanical retaining clip and thereby release the platform/plate.

The above described camera mount 10 provides a number of advantages and improvements. The mount is particularly versatile in that it is a portable, lightweight device by virtue of its incorporation of solid state electronic sensors and low-profile actuator. In addition, the mount can be placed directly on and used effectively with a variety of surfaces, and is not restricted to use with the tripod.

Simple one-touch button operation and automatic levelling to a pre-set reference planes makes it easy and quick to operate. Further, the sensor and actuator permits the platform and camera to be leveled to a high degree of accuracy, while the settling time for the platform to be aligned is short.

The ability of the mount to level to different reference planes allows a camera to be aligned accurately for specific types of photographs. For example, the platform and camera may be leveled to the horizontal plane for panoramic photos, the inverted horizontal plane for directly overhead shots, and vertical planes for portraits. Further, selective levelling along one axis allows a camera to be tilted about a second perpendicular axis may be beneficial for example when attempting to photograph objects on ground where accurate alignment to the horizontal is still desirable.

Various modifications and changes may be made within the scope of the invention herein described. For example, the sensor may be incorporated in a camera, optionally with the photo sensor able to rotate, which allows the sensor to be rotated to align with the horizon if desired. In other embodiments, the apparatus may be integrated with a tripod and/or used to control movement of the legs to level the tripod head.

The invention claimed is:

1. A portable leveling camera mount comprising:
a platform for mounting a camera, wherein the platform is defined by at least one axis for alignment of the camera thereto;
a sensor for detecting an orientation of the platform; and
an actuator coupled to the platform, wherein the actuator moves the platform in response to the orientation detected via the sensor for leveling at least one axis to a reference plane;
wherein the platform has a surface defining a first axis and a second axis, the mount has a first leveling mode, in which the actuator moves the platform such that solely the first axis of the platform is leveled to the reference plane and the second axis of the platform is tilted with respect to said reference plane.

2. The portable leveling camera mount of claim 1, wherein the the mount has a second leveling mode in which said actuator moves the platform such that both the first and the second axis of the platform are leveled to the reference plane.

3. The portable leveling camera mount of claim 2, wherein the mount has a selector for selectivly operating the mount in the first and second leveling modes, and wherein the selector includes a touch-operable button for one-touch operation of the mount in a leveling mode.

4. The portable leveling camera mount of claim 3, wherein the mount is programmed to select the leveling mode according to an orientation detected by the sensor.

5. The portable leveling camera mount of claim 1, wherein the reference plane is a true horizontal plane; a plane inclined by an angle of about 45° to horizontal; or a true vertical plane.

6. The portable leveling camera mount of claim 1 wherein the reference plane is user-specified.

7. The portable leveling camera mount of claim 1, wherein, while the leveling camera mount is in use, the mount is generally positioned in an orientation that is horizontal; vertical; or inverted horizontal.

8. The portable leveling camera mount of claim 1, wherein the mount has one or more of the following characteristics:
the mount is programmed to select the reference plane according to an orientation detected by the sensor;

the mount further comprises a controller programmed to control movement of the platform;

the mount takes the form of an independently operable electronic mount containing its own power supply;

and the mount is a light-weight and compact device having an overall height of between 5 and 15 cm, and a maximum width of between 5 and 15 cm.

9. The portable leveling camera mount of claim 8, wherein the controller has one or more of the following characteristics:

the controller is programmed to determine the movement required to level the axes of the platform;

the controller is adapted to receive a detection signal from the sensor and to produce an actuation signal for controlling the actuator; and the controller is configured to store reference frame information.

10. The portable leveling camera mount of claim 1, wherein the mount has one or more of the following characteristics:

the mount is configured to be located for use on a stable, non-level surface;

the mount has an upper member including the platform and a base member for locating on a supporting surface, wherein the upper member is moveable with respect to the lower member to level axes of the platform, the mount being further operable to lock the platform in position with respect to lower member when axes of the platform are leveled to the reference plane;

the mount has an upper member including the platform and a base member for locating on a supporting surface and a connector for securing the camera to the platform, wherein the connector is provided with a pivot for allowing the platform, with the camera secured thereto, to be rotated with respect to the upper member;

the mount further comprises a motor operable to rotate the platform stepwise to desired angular positions; and the mount has a quick-release mechanism to allow the platform, with the camera secured thereto, to be readily detached from and re-attached to the mount as required.

11. The portable leveling camera mount of claim 1, wherein the mount has one or more of the following characteristics:

the platform in the first leveling mode is tilted by a user-specified tilt angle;

the platform is lockable in position after the first and/or second axes of the platform have been leveled to the reference plane; and the platform is provided with an alignment notch to align an optical axis of the camera with respect to the platform axes.

12. The portable leveling camera mount of claim 1, wherein the actuator includes a drive mechanism that is operable to move the platform in six degrees of freedom to move the platform about and in the direction of three orthogonal axes to take up any orientation in space.

13. The portable leveling camera mount of claim 1, wherein the sensor is adapted to detect the absolute orientation of the platform in space.

14. The portable leveling camera mount of claim 1, wherein the selector includes an infrared (IR) communication device for remote control of the mount.

* * * * *

UNITED STATES PATENT AND TRADEMARK OFFICE
CERTIFICATE OF CORRECTION

PATENT NO.       : 8,408,820 B2                                   Page 1 of 1
APPLICATION NO. : 12/996569
DATED            : April 2, 2013
INVENTOR(S)      : Graham Manson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 13 days.

Signed and Sealed this
First Day of September, 2015

Michelle K. Lee
*Director of the United States Patent and Trademark Office*